Nov. 30, 1937. W. S. AIKEN 2,100,930
PAPER CUTTING APPARATUS
Original Filed Nov. 17, 1935
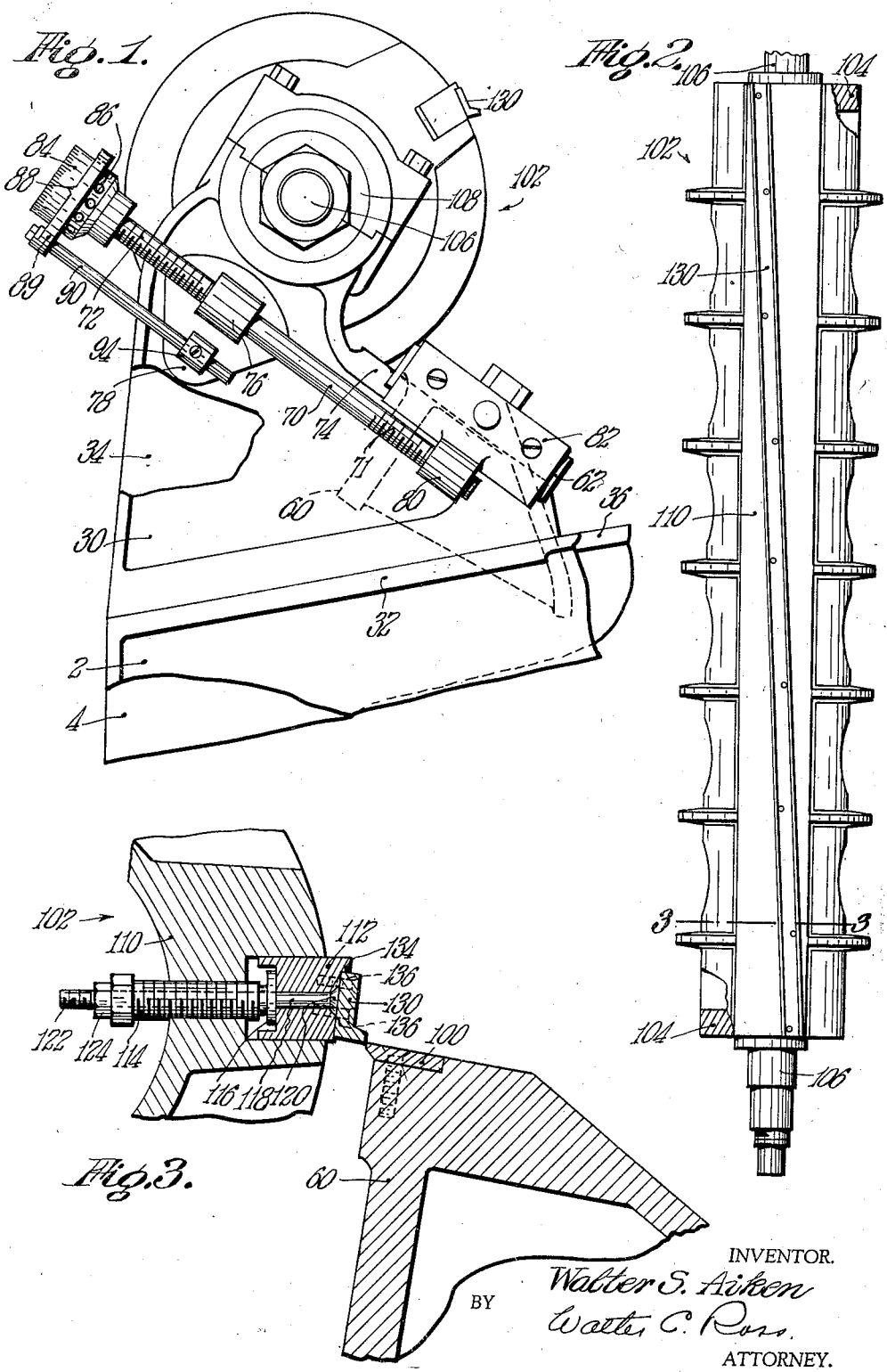
INVENTOR.
BY Walter S. Aiken
Walter C. Ross.
ATTORNEY.

Patented Nov. 30, 1937

2,100,930

UNITED STATES PATENT OFFICE 2,100,930

PAPER CUTTING APPARATUS

Walter S. Aiken, Lee, Mass., assignor to The Clark-Aiken Company, Lee, Mass., a corporation of Massachusetts Original application November 17, 1935, Serial No. 51,877, now Patent No. 2,062,737. Divided and this application October 28, 1936, Serial No. 107,953

5 Claims. (Cl. 164—66)

This invention relates to improvements in apparatus for cutting a web or webs of materials, such as paper, into successive lengths to provide separate sheets and this application is a division of an application filed on November 27, 1935, Serial No. 51,877.

One object of the invention disclosed in this application is the provision of a machine of the class described which is characterized by a novel combination and arrangement of parts adapted and arranged for the efficient and accurate cutting of a web of paper or the like into sheets of various lengths.

Another object of the invention is the provision of a machine wherein one of a pair of relatively movable cutting or shear members acts at a substantial angle on the other so that it is possible to obtain the desired shearing action which in combination with certain self-sharpening features to be described facilitates efficiency and speed in operation as well as accuracy in the sheets cut from the web.

A further object of the invention is the provision of relatively movable cutting members wherein the coacting edges thereof are arranged to function with a shearing cut with the angle of incidence constant throughout the cutting operation.

Various and numerous other novel objects and advantages of the machine of the invention will hereinafter more fully appear in connection with the accompanying description of the preferred form thereof, it being understood that various changes and modifications may be made therein without departing from the spirit and scope of the invention. In the drawing:

Fig. 1 is a partial side elevational view of a cutting apparatus embodying the novel features of the invention;

Fig. 2 is a side elevational view of the cylinder of the cutting apparatus of the invention; and Fig. 3 is an enlarged sectional elevational view on the line 3—3 of Fig. 2 at an enlarged scale to show how the cutting elements are positioned relative to one another.

Referring now to the drawing more in detail, the invention will be more fully explained.

The cutting apparatus of this application may be used in connection with such a machine as shown and described in the copending application above referred to or it may be associated with machines of various forms. The machine of the said application has forward and rear frame members represented by 2 and 4 in the drawing which may be tied together by any suitable means.

A forward bracket 30 is mounted on a flange part 32 of the forward frame or bracket 2. The flange 32 is preferably inclined, as shown in Fig. 1. A rear bracket 34, similar to the bracket 30, is mounted on a flange 36 of the rear frame 4. These brackets 30 and 34 have journalled therein what may be called a fly cylinder 102 which carries a cutting element such as a knife or shear. The cylinder may be rotated in any well known manner, as by a gear, pulley, or the like.

A cutter bed bar 60 is disposed transversely of the machine between brackets 30 and 34 and is arranged and adapted for supporting in a rigid manner a relatively stationary shear or knife with which the shear or knife of the fly cylinder co-operates for the cutting or shearing action. On either end of this member 60 there are blocks such as 62 which slide on finished surfaces or flanges 74 of the brackets 30 and 34. In the form of the invention shown, the flanges 74 are inclined so that the said bar 60 may move towards and away from the axis of rotation of shaft 106 of the fly cylinder 102 presently to be described.

Means for moving the bed bar 60 back and forth relative to the brackets 30 and 34 consist of screws 70 which have threaded portions 72 and 71. These screws have their threaded portion 72 in threaded engagement with nuts 76 associated with brackets 78 which are affixed to the brackets 30 and 34. The other threaded portions 71 of the screws are in threaded engagement with nuts 80 associated with plates 82 which are affixed, as by screws or the like, to the parts 62.

Parts 84 on the outer end of the screws may carry indicia and the screws 70 may be rotated in one direction or the other as by means of a tool inserted in recesses 86 associated with the parts 84. Pointers 88 are carried by rings 90 which are supported by rods 92 and are clamped in lugs 94 associated with the brackets 78.

Since the adjusting mechanism just described is employed in connection with both the brackets 30 and 34, it will be seen that the bed bar 60 may be adjusted at its opposite ends.

A stationary knife 100 having a forward cutting or shearing edge as shown in Fig. 3 is affixed to the bed bar 60. The fly cylinder 102, previously referred to, and shown in Fig. 2, is preferably generally tubular in form and has heads such as 104 at opposite ends in which are fixed the trunnions or shafts 106.

The shafts 106 are rotatable in bearings 108 associated with the brackets 30 and 34 and the fly cylinder 102 has one or more longitudinally extending portions 110 along the side or sides thereof which carry in their peripheral faces, longitudinally extending grooves or slots, as shown.

These grooves or slots are angularly and spirally disposed relative to a plane passing through the axis of the cylinder, for a purpose which will presently appear, and there is disposed therein a fly bar 112, a cross section of which is shown more clearly in Fig. 3. A plurality of spaced and externally threaded hollow bolts 114 are in threaded engagement with bar 102 and washers 116 are disposed between the inner ends of the members 114 and the rear side of the fly bar 112.

Bolts 118 extend through the hollow bolts 114 and fly bar 112 and they are provided with heads 120 which may be countersunk in the forward part of the fly bar. Threaded ends 122 of the bolts 118 are threadedly received in nuts 124 and thus the fly bar may be accurately positioned and rigidly and securely held in the fly cylinder, the fly bar being drawn against the bolts 114 by the bolts 118.

A cutter knife or shear 130 is disposed on the outer face of the fly bar 112 and a shoulder 134 is provided on member 112 against which the upper edge of the cutter knife may abut. In this way the cutter knife is more or less reinforced for the cutting or shearing action. The lower end of the cutter knife is provided with a cutting edge as indicated in Fig. 3 and is arranged to co-operate with the cutting edge of the stationary knife 100.

The cutter knife 130 may be secured to the fly bar 112 by means of screws 136 which, as shown, are arranged therealong in spaced and preferably staggered relation.

It is desired, according to the preferred form of the invention, that one of the co-operating knives be made of material which is relatively soft as compared with the other. For example, the knife 130 in the cylinder 102 may be made of cast iron while the stationary knife 100 may be made from steel which is suitably heat treated. Then in the operation of the machine, the knife 100 tends to maintain the cutting edge of knife 130 in a sharpened condition at all times or, in other words, the knife 130 may be said to be self sharpening.

It will be seen that by reason of this arrangement, there results a greater degree of efficiency in operation of the machine since it is not necessary to stop for knife replacement or sharpening. Furthermore, where the knife 130 is of iron, as described, it is possible to obtain a very desirable shearing action which is not possible where both the knives are of steel since in that case, the angularity of the knives with reference to the plane of the axes of rotation of the fly cylinder must be much less than may be employed in the construction with which this invention is concerned.

The arrangement described in connection with Fig. 1 whereby the bed bar 60 may be adjusted facilitates adjusting within extremely fine limits so that the stationary knife or shear may be set in the desired position relative to the knife or cutter of the fly cylinder. In operation, the material being cut, such as paper, is directed between the co-acting cutting knives and as the member 102 is rotated successive cuts may be made.

The apparatus is, as stated, adapted for cutting a web into sheets of various lengths and it will be observed that the co-operating cutting knives or shear knives are arranged for the most efficient operation in that one knife is self-sharpening, so-called, to eliminate the necessity of stopping the machine for the purpose of conditioning the knife. By reason of the particular nature of the knives and their operative functions, the sheering action may be substantial and the angle of incidence of the coacting cutting edges is constant which is desired in machines of this kind both from the standpoint of efficiency, production and speed of operation.

While I have described the invention in great detail and with respect to a preferred form thereof, it is not desired to be limited thereto since many changes and modifications may be made therein without departing from the spirit and scope of the invention. What it is desired to claim and secure by Letters Patent of the United States is:

1. Web-cutting mechanism comprising in combination, a support, a rotatable member thereon, a relatively stationary member, a knife on said rotatable member and a knife on said relatively stationary member having co-operating cutting edges, the said knives being disposed so the cutting edges thereof are arranged angularly with relation to a plane passing through the axis of rotation of said rotatable member whereby the cutting edges operate with a shearing action and the angle incidence is constant throughout the shearing action, the said knives being formed of relatively different materials one of which is softer than the other whereby during the shearing action one is sharpened by the other.

2. Web-cutting mechanism comprising in combination, a support, a rotatable member thereon, a relatively stationary member, a knife on said rotatable member and a knife on said relatively stationary member having co-operating cutting edges, the said knives being disposed so the cutting edges thereof are arranged angularly with relation to a plane passing through the axis of rotation of said rotatable member whereby the cutting edges operate with a shearing action and the angle incidence is constant throughout the shearing action, one of said knives being of cast iron and relatively softer than the other whereby as the knives operate for a shearing action one is sharpened by the other.

3. In a machine of the class described, a rotatable member having a longitudinally extending slot in its periphery and disposed angularly relative to the plane of the axis of rotation of said member, a knife carrying bar therein, adjusting members spaced along said slot adjustable axially in said rotatable member engaging the rear face of said bar, and clamping members urging said bar against said adjusting members, the said adjusting members including hollow bolts threadedly engaging said rotatable member and the said clamping members including bolts associated with the knife bar and extending through the hollow bolts having threaded ends and nuts thereon abutting the inner ends of said hollow bolts.

4. In a machine of the class described comprising in combination, a rotatable member having a longitudinally extending slot in its periphery and disposed angularly relative to the axis of rotation of said member, a knife carrying bar movable in the slot towards and away from the axis of rotation of said member, adjustable clamping means spaced along said slot including, hollow members threadedly engaging the rotatable member movable radially thereof against the outer end of which the knife carrying bar abuts, other members passing through the hollow members secured to the knife bar, and means for moving the latter towards the hollow members whereby the knife bar is clamped to the hollow members in their various positions of adjustment.

5. In a machine of the class described comprising in combination, a support, a rotatable member therein provided with a substantially straight longitudinally extending slot, a relatively stationary member, a knife thereon, a knife in the slot of the rotatable member having a substantially straight cutting edge extending angularly relative to a plane passing through the axis of rotation of the rotatable member and acting with a shearing action on the first-named knife with a constant angle of coincidence throughout the shearing action.

WALTER S. AIKEN.